United States Patent
Swahn

(10) Patent No.: US 12,500,872 B1
(45) Date of Patent: *Dec. 16, 2025

(54) SECURE CONTROLLED COMMUNICATIONS

(71) Applicant: Alan Earl Swahn, Fairview, PA (US)

(72) Inventor: Alan Earl Swahn, Fairview, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/041,074

(22) Filed: Jan. 30, 2025

(51) Int. Cl.
*H04L 9/40* (2022.01)
*H04L 9/32* (2006.01)

(52) U.S. Cl.
CPC .......... *H04L 63/045* (2013.01); *H04L 9/3247* (2013.01)

(58) Field of Classification Search
CPC .......................... H04L 63/045; H04L 9/3247
See application file for complete search history.

(56) References Cited

U.S. PATENT DOCUMENTS

| | | |
|---|---|---|
| 7,073,063 B2 | 7/2006 | Peinado |
| 7,082,536 B2 | 7/2006 | Filipi-Martin et al. |
| 7,099,478 B2 | 8/2006 | Tomlinson |
| 7,421,411 B2 | 9/2008 | Kontio et al. |
| 7,496,750 B2 | 2/2009 | Kumar et al. |
| 7,987,272 B2 | 7/2011 | Kumar et al. |
| 7,996,556 B2 | 8/2011 | Raghavan et al. |
| 8,155,306 B2 | 4/2012 | Brickell et al. |
| 9,003,548 B2 | 4/2015 | Pigin |
| 9,537,657 B1 * | 1/2017 | Char ...................... H04L 9/0637 |
| 10,348,690 B2 * | 7/2019 | Kagarlitsky .......... H04L 51/066 |
| 10,637,837 B1 * | 4/2020 | Lowry ................ H04L 63/0435 |
| 11,729,151 B2 * | 8/2023 | Swahn .................. H04L 9/0656 |
| | | 713/168 |
| 11,888,832 B2 * | 1/2024 | Feinberg ............... H04L 9/3247 |
| 2003/0120601 A1 | 6/2003 | Ouye et al. |

(Continued)

OTHER PUBLICATIONS

"Disk Encryption" Wikipedia, Wikimedia Foundation, Apr. 26, 2022, https://en.wikipedia.org/wiki/Disk_encryption.

(Continued)

*Primary Examiner* — Ghodrat Jamshidi
(74) *Attorney, Agent, or Firm* — Cherskov Flaynik & Gurda LLC

(57) ABSTRACT

A system for secure controlled communications between entities is described that incorporates: confidentiality, sender authentication, data integrity, malware resistance, and author defined rights. A novel mechanism is described where the system creates symmetric encryption parameters ("SEPs") for each message and independently encrypts message: metadata, rights, body, and attachments with symmetric encryption. The SEPs themselves are encrypted with asymmetric encryption, using the recipient's public asymmetric encryption key. Only intended recipients can decrypt the encrypted SEPs with their corresponding private asymmetric decryption key and use these SEPs to decrypt encrypted: metadata, rights, body, and attachments. The system also generates a digital signature of these SEPs, signed by the sender with their private asymmetric signature key. This allows any recipient to authenticate the sender by verifying the digital signature using the sender's public asymmetric signature key. Actions taken on a message and its disposition are controlled by message rights set by the author.

22 Claims, 17 Drawing Sheets

Creating Symmetric Encryption Parameters Embodiment

(56) References Cited

U.S. PATENT DOCUMENTS

| | | |
|---|---|---|
| 2004/0003139 A1 | 1/2004 | Cottrille et al. |
| 2005/0256834 A1 | 11/2005 | Millington et al. |
| 2008/0127315 A1 | 5/2008 | Kim |
| 2009/0327714 A1 | 12/2009 | Yaghmour |
| 2010/0008500 A1* | 1/2010 | Lisanke ............... G06T 1/0021 380/201 |
| 2011/0314304 A1* | 12/2011 | Braams ................. G06F 21/78 713/193 |
| 2013/0073850 A1* | 3/2013 | Zaverucha ........... H04L 9/0869 713/168 |
| 2015/0270974 A1* | 9/2015 | Lochmatter .......... H04L 9/3236 713/165 |
| 2016/0028700 A1* | 1/2016 | Meehan ............... H04L 9/3247 713/171 |
| 2016/0191472 A1 | 6/2016 | Ghafourifar |
| 2018/0013728 A1* | 1/2018 | Carlson ............... H04L 63/0435 |
| 2020/0119917 A1* | 4/2020 | Christensen .......... H04L 9/0894 |
| 2023/0221949 A1* | 7/2023 | Lan ........................ G06F 21/64 717/168 |
| 2024/0340034 A1* | 10/2024 | Zalewski ........... G06Q 30/0635 |

OTHER PUBLICATIONS

"Digital signature" Wikipedia, Wikimedia Foundation, May 17, 2022, https://en.wikipedia.org/wiki/Digital_signature.

Elaine Barker, Recommendation for Key Management, SP 800-57 Part 1 Rev. 5, NSIT, Finalized May 4, 2020.

Lily Chen, et al., "Report on Post-Quantum Cryptography" NISTIR 8105, Published Apr. 2016.

National Institute of Standards and Technology Canadian Center for Cyber Security, "Implementation Guidance for FIPS 140-2 and the Cryptographic Module Validation Program" Revised Mar. 14, 2022.

* cited by examiner

Maximum Symmetric Encryption Parameters Data Size Illustration

| Algorithm | Effective Key Size (bits) | Padding Type | Maximum Data Size (bytes) | ¹Security Level (bits) |
|---|---|---|---|---|
| RSA | 2048 | OaepSHA256 | 190 | 110 |
| GEE RSA | 16384 | OaepSHA256 | 1519 | 269 |
| RSA | 4096 | OaepSHA256 | 446 | 149 |
| GEE RSA | 32768 | OaepSHA256 | 3567 | 358 |
| RSA | 8192 | OaepSHA256 | 958 | 201 |
| GEE RSA | 65536 | OaepSHA256 | 7663 | 474 |
| RSA | 16384 | OaepSHA256 | 1982 | 269 |
| GEE RSA | 131072 | OaepSHA256 | 15855 | 625 |
| RSA | 2048 | OaepSHA512 | 126 | 110 |
| GEE RSA | 16384 | OaepSHA512 | 1007 | 269 |
| RSA | 4096 | OaepSHA512 | 382 | 149 |
| GEE RSA | 32768 | OaepSHA512 | 3055 | 358 |
| RSA | 8192 | OaepSHA512 | 894 | 201 |
| GEE RSA | 65536 | OaepSHA512 | 7151 | 474 |
| RSA | 16384 | OaepSHA512 | 1918 | 269 |
| GEE RSA | 131072 | OaepSHA512 | 15343 | 625 |

1 Correspondence between the length of an RSA key and the length of a symmetric key of an identical strength.

Figure 17

SECURE CONTROLLED COMMUNICATIONS

CLAIM OF PRIORITY

The current application claims priority as a continuation-in-part of U.S. application Ser. No. 18/216,564, titled "Rights Controlled Communication," filed on Jun. 29, 2023, presently pending, which in turn claimed priority as a continuation of U.S. application Ser. No. 16/849,663, filed on Apr. 15, 2020, patented as U.S. Pat. No. 11,729,151 on Aug. 15, 2023, and which in turn claimed priority as a continuation of U.S. application Ser. No. 15/816,526 filed on Nov. 17, 2017, issued as U.S. Pat. No. 10,645,066 on Apr. 15, 2020, and in turn claimed priority to U.S. provisional application 62/424,440 filed on Nov. 19, 2016. The contents of the application are hereby incorporated by reference.

FIELD OF THE INVENTION

This invention, secure controlled communications, hereinafter referred to as "SCC" relates to:
 (i) a networked communications environment;
 (ii) the operation of information exchange applications;
 (iii) hierarchical information composition;
 (iv) ensuring information confidentiality through end-to-end encryption;
 (v) encrypting symmetric encryption parameters using asymmetric encryption;
 (vi) encrypting information using symmetric encryption;
 (vii) only intended recipients consuming information;
 (viii) authenticating information sender of information once received;
 (ix) verifying data integrity of information once received;
 (x) controlling the disposition of information; and
 (xi) controlling what actions can be taken on information.

BACKGROUND

A portion of the web economy depends on legal surveillance of people including social media posts, scanning emails, tracking website visits, browser search history, network geolocation, device profiling, device fingerprinting, entertainment watched, purchases, subscriptions, health tracking, political affiliation, donations, employment, residence, occupation, age, gender, and interests. There is also an illegal side that takes advantage of available online personal identity information coupled with hacked, leaked, or stolen information from retailers, government agencies, online services, and personal devices.

This surveillance invades every aspect of our lives including habits, lending, spending, to whom we are communicating with, where we go, how we travel, thoughts, preferences, and ideas. A lot can be learned about a person through surveilling web searches. Technology has gone far beyond inferring what a person is searching for through keyword analysis or lexical search. Technology can now understand a person's intent, context, and emotions through semantic search, contextual search, and affective artificial intelligence, respectively. Advances in technology are ensuring that each person's privacy reservoir is porous.

A great deal of this siphoned activity related to personal habits is difficult to stop as vendors build siphons into their products and bury the approval in their terms of service that must be accepted by the end user to use their product. The justification usually falls into the categories of security, safety, convenience, automation, "help us improve," or "to better serve you." Never mind that user information is being sold/used/shared by vendors for profit.

A person's expectation of communication privacy is multifaceted. While a person may have been warned of being recorded/monitored to use a call center, hotline, or chatbot, it's fair to assume that didn't mean carte blanch approval to use their information for any purpose or sell their information to third parties. But with a simple accept click or tap, privacy is out the door. And there may be no warning at the time of the communication regarding privacy, as that right to privacy was stripped in advance when signing up for a communications platform or accepting the terms of service for a website.

There are products to bolster privacy for some facets of communication, such as, web browsing and searching. DuckDuckGo is a web browser and search engine that does not track your online activity or personal information. Web browsers can be used in conjunction with a VPN service to obfuscate a person's network geolocation. But vendor's websites can still ask for your location "to better serve you" to put you in a virtual brick and mortar store closest to you. If you purchase a product and enter a home address, ship-to address, phone number, and credit card number, the vendor has peeled your privacy onion.

Internet protocol HTTPS (Hypertext Transfer Protocol Secure) helps to secure data communications and authenticate websites. While this is a solution for data transport, it doesn't solve the greater problem of insecure data at rest, both on the client side and server/business side. The data at a business may be vulnerable to hacking or an employee with the right credentials stealing data. Data on a client may be stolen or exposed by: malware, stealing a device, allowing access to the wrong person, authorities confiscating devices, automated sharing between devices, automated backup to the cloud, or unintended sharing between clients. And while websites may be authenticated, it doesn't solve the problem of authenticating communicating parties and communications being open to phishing, spoofing, and other attacks. Some forms of communications may not be protectable, like using a call center/hotline from a phone, where an analog voice can be converted to text, which is then data that an artificial intelligence engine can then infer why a person called, the intent of the call, the emotional state of the caller, and if the caller is satisfied with the reply.

Personal and business communications should have an expectation of privacy and be protected. This isn't possible today, with the web economy pitted against privacy in the monetization of communications. A solution is needed to protect common/daily communications, such as video, audio, photo, and image sharing; multimedia messaging; texting; video telephony; Internet Protocol telephony; and email that ensures privacy, makes impersonation obvious, and successful hacking impossible.

BRIEF SUMMARY

This invention, Secure Controlled Communications ("SCC") facilitates information exchange by incorporating the concepts of the Rights Controlled Communication invention with asymmetric encryption, symmetric encryption, and digital signatures where:
 (i) information may include multimedia, files as attachments, folders of files as attachments, and hierarchical attachments—tree(s) of folders of files;
 (ii) information is private and secure through end-to-end encryption;

(iii) information can be protected against advances in quantum computing;
(iv) information confidentiality and integrity is provided through authenticated encryption;
(v) the information sending party can be authenticated by information recipients;
(vi) only intended parties can consume information;
(vii) the disposition of information is controlled by information author, such as how long information can be used before deleting; and
(viii) the actions that can be taken on information are controlled by information author, for example copying, forwarding, and/or printing.

Communication/information/message scanning, leaking, hacking, phishing, tampering, and malware injection are too commonplace because of deficiencies in current communication systems. This invention: prevents message scanning, leaking, and successful hacking through end-to-end encryption; ensures message confidentiality and integrity through authenticated encryption, authenticates senders to foil phishing; integrity-checks message metadata, message rights, message body, and each attachment to expose tampering; and thwarts malware injection by not allowing a message to be created with attachments that are executables or a message body containing obfuscated hyperlinks. Today, once a message is received, the recipient usually controls its use and longevity. By comparison, this invention puts the power in the message author's hands to control the actions that can be taken on a message and the disposition of a message.

There is concern that advances in quantum computing will break today's encryption methods revealing plaintext from ciphertext. The measure of strength that an encryption cipher achieves encrypting data is its security level and depends on the key size used with a cipher. The security level is expressed in bits; for asymmetric encryption ciphers, it is calculated per the formula provided in the National Institute of Standards and Technology ("NIST") publication, "Implementation Guidance for FIPS 140-2 and the Cryptographic Module Validation Program" page 122; and for symmetric encryption ciphers, it's the number of bits actually used by a cipher from its encryption key. RSA ("Rivest-Shamir-Adleman"), which is a popular asymmetric encryption cipher. RSA with a large key size of 8192 bits is not considered to be quantum-safe by NIST. AES ("Advanced Encryption Standard"), which is a popular symmetric encryption cipher, with a key size of 128 bits is also not considered by NIST to be quantum-safe. SCC implementations designate the permitted encryption algorithms, encryption algorithm key sizes, digital signature algorithms, digital signature hash algorithms, and digital signature algorithm key sizes and therefore control whether data secured by an implementation can be considered quantum-safe. SCC implementations may also achieve a quantum-safe security level by using General Encryption Enhancement, U.S. Pat. No. 12,047,487, and Digital Signature Enhancement, U.S. Pat. No. 12,143,469, to enhance encrypters and digital signature generators. The contents of these applications are hereby incorporated by reference. The aforementioned RSA with a 8192 bit key enhanced by GEE RSA with an effective key size of 65536 bits would be considered quantum-safe. Similarly, AES with a 128 bit key enhanced by GEE AES with an effective key size of 1024 bits, would also be considered quantum-safe.

BRIEF DESCRIPTION OF DRAWINGS

The present invention is described with respect to particular exemplary embodiments thereof and reference is accordingly made to the drawings in which:

FIG. 17 shows an illustration of the maximum symmetric encryption parameters data size that can be encrypted by an RSA encryption algorithm or General Encryption Enhancement ("GEE") enhanced RSA version with various effective key sizes and encryption padding types and the encrypted data security level achieved.

DETAILED DESCRIPTION

Summary of Notations and Nomenclature

Figure 1:
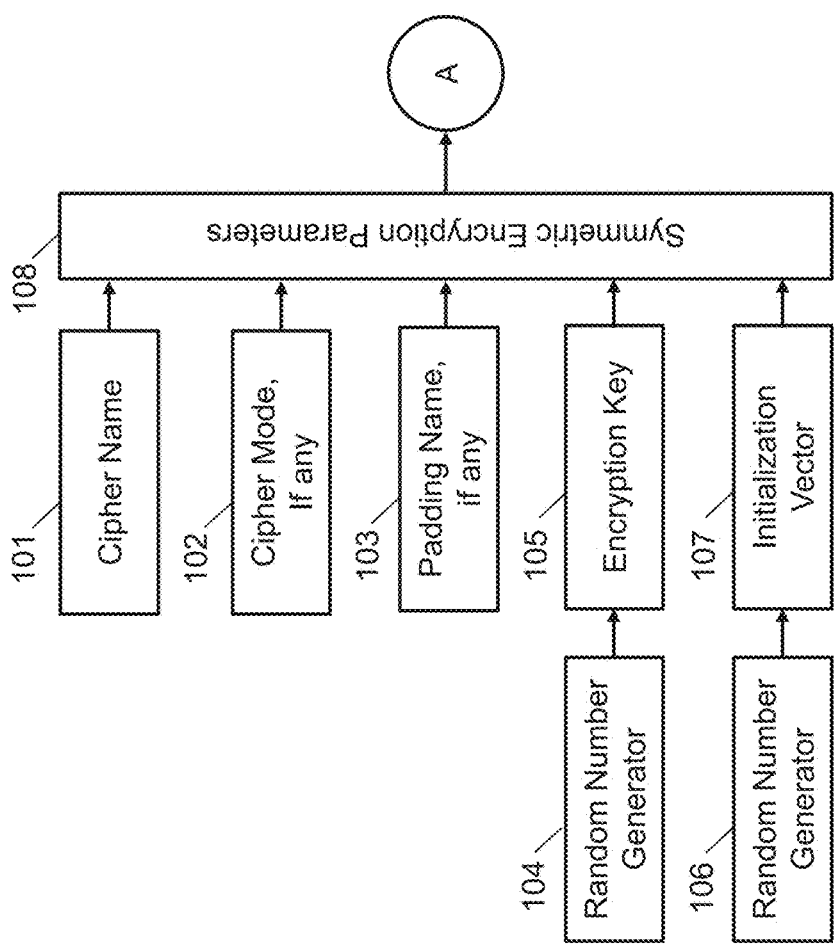
FIG. 1 depicts an embodiment of creating symmetric encryption parameters including:
(i) cipher name;
(ii) cipher mode, if any;
(iii) padding name, if any;
(iv) using a random number generator to create an encryption key; and
(v) using a random number generator to create an initialization vector with continuations on FIGS. 3, 5 and 8.

Found below is a brief overview of the acronyms and other notations used throughout the detailed description.

Rights Controlled Communication—means the invention that enables controlling the disposition of information/messages and what actions can be taken on information/messages.

Actions—are the author's defined rights that control what actions may be taken on information, including but not limited to:
  (i) whether rights are viewable;
  (ii) the number of views permitted;
  (iii) whether printing is permitted;
  (iv) whether copying is permitted;
  (v) whether forwarding is permitted;
  (vi) whether message elements may be deleted, before forwarding a message;
  (vii) whether message elements may be altered, before forwarding a message; and
  (viii) whether message may be augmented, before forwarding a message.

Disposition—are the author's defined rights that control the disposition of a message, including but not limited to:
  (i) deleting;
  (ii) deleting after a particular date;
  (iii) deleting after a particular date and time;
  (iv) deleting after a permitted number of views;
  (v) locking to disable opening;
  (vi) locking to disable opening after a particular date;
  (vii) locking to disable opening after a particular date and time;
  (viii) locking to disable opening after a permitted number of views; and
  (ix) whether a password is required to open and its value.

Message Rights—are any combination of Actions and Disposition.

MAC—means message authentication code or authentication tag, which is a short piece of information used for authenticating and/or integrity-checking Data.

Asymmetric Encryption Parameters—means parameters for an Asymmetric Encryption encrypter or decrypter including:
  (i) encryption algorithm name; and
  (ii) padding name, if any.

Symmetric Encryption Parameters—means parameters for a Symmetric Encryption encrypter or decrypter including:
  (i) cipher name;
  (ii) cipher mode, if any;
  (iii) padding name, if any;
  (iv) random number generated encryption key; and
  (v) random number generated initialization vector.

Digital Signature Parameters—means parameters for a Digital Signature generator or verifier including:
  (i) Digital Signature algorithm name;
  (ii) hash algorithm name; and
  (iii) signature padding mode name, if any.

Message Metadata is information about a message, including but not limited to:
  (i) author identification;
  (ii) creation date and time;
  (iii) sender identification;
  (iv) sent date and time;
  (v) subject;
  (vi) sender group identification;
  (vii) recipient identification;
  (viii) list of recipients;
  (ix) carbon copy list of recipients;
  (x) blind carbon copy list of recipients;
  (xi) number of message attachments; and
  (xii) indicator whether message was forwarded or not.

Message—is composed of message elements including:
  (i) Asymmetric Encryption Parameters;
  (ii) encrypted Symmetric Encryption Parameters encrypted by a Asymmetric Encryption encrypter;
  (iii) Digital Signature Parameters;
  (iv) message sender's Digital Signature of Symmetric Encryption Parameters;
  (v) encrypted Message Metadata, where Message Metadata has been encrypted by a Symmetric Encryption encrypter;
  (vi) Message Metadata MAC generated by a Symmetric Encryption encrypter during Message Metadata encryption;
  (vii) encrypted Message Rights, where Message Rights have been encrypted by a Symmetric Encryption encrypter;

(viii) Message Rights MAC generated by a Symmetric Encryption encrypter during Message Rights encryption;
(ix) encrypted message body, where message body has been encrypted by a Symmetric Encryption encrypter;
(x) message body MAC generated by a Symmetric Encryption encrypter during message body encryption;
(xi) any encrypted message files/attachments, where such files/attachments have been encrypted by a Symmetric Encryption encrypter;
(xii) each message file/attachment MAC generated by a Symmetric Encryption encrypter during file/attachment encryption; and
(xiii) any hierarchical arrangement of encrypted message files/attachments and folders containing encrypted message files/attachments.

Data—is a sequence of one or more bytes.

Byte/byte—means a unit of digital information that consists of eight bits.

Cipher—means a Key-based algorithm that performs encryption and decryption.

Key—is a sequence of digital bits that is an input to a Cipher.

Asymmetric Encryption—means a type of digital Data encryption that uses a Cipher with a pair of mathematically related Keys, a public asymmetric encryption Key and a private asymmetric decryption Key, where input Data that has been encrypted using the public asymmetric encryption Key can only be decrypted using the related private asymmetric decryption Key.

Asymmetric Signature or Digital Signature—means a type of Data digital signature that uses a pair of mathematically related Keys, a public asymmetric signature Key and a private asymmetric signature Key, where input Data that has been signed using the private asymmetric signature Key can only be verified using the related public asymmetric signature Key.

Symmetric Encryption—means a type of digital Data encryption that uses a block or stream Cipher with the same Key to encrypt and decrypt Data.

RSA—in cryptography is an Asymmetric Encryption algorithm described by Ron Rivest, Adi Shamir, and Leonard Adleman; and for the purposes considered herein, the implementations of RSA include padding.

NIST—means National Institute of Standards and Technology.

Security Level—means a measure of the strength that a Cipher achieves expressed in bits. For Asymmetric Encryption Ciphers it is calculated per the formula provided in NIST publication, "Implementation Guidance for FIPS 140-2 and the Cryptographic Module Validation Program," last updated Nov. 5, 2021, page 122, and for Symmetric Encryption Ciphers it is the number of bits actually used by a Cipher from its encryption Key for encryption.

General Encryption Enhancement or GEE—means the patented invention, U.S. 12,047,487, incorporated herein by reference, which significantly increases the security level of asymmetrically or symmetrically encrypted data—ciphertext—without modification to underlying ciphers.

Digital Signature Enhancement or DSE—means the patented invention, U.S. 12,143,469, incorporated herein by reference, which improves a computer's digital signing capabilities without modification to underlying signature algorithms.

In general prior art communication systems:
(i) lack independent Message Rights, set by the message author, to control the Disposition of a message and the Actions that can be taken on a message;
(ii) don't allow folders of files as message attachments;
(iii) don't allow hierarchical message attachments—tree(s) of folders of files;
(iv) don't forbid the inclusion of obfuscated hyperlinks and executable message attachments that may be routes to malware;
(v) don't authenticate the message sender;
(vi) don't ensure that all sent and received messages are end-to-end encrypted and can only be decrypted by a device having the recipient's private asymmetric encryption key; and
(vii) don't ensure that messages are quantum-safe.

SCC takes a new approach enabled by Rights Controlled Communication, Asymmetric Encryption, Symmetric Encryption, and Digital Signatures. Parties to a communication first share their public Asymmetric Signature Key and Asymmetric Encryption Key to allow a Message sender to be authenticated and a Message to be read by a recipient. The keys could be the same key, if the SCC implemented algorithm, like RSA, supports data encryption, as well as, data signing. Message composition allows folders of files as message attachments and hierarchical message attachments—tree(s) of folders of files. To combat paths to malware, obfuscated hyperlinks are not permitted in a message body and executables are not permitted as message attachments.

To allow for different system implementations, Symmetric Encryption Parameters, Asymmetric Encryption Parameters, and Digital Signature Parameters are message elements. SCC generates a random encryption key and random initialization vector for each Message. Message elements also include encrypted: Message Metadata, message body, Message Rights, and message attachments encrypted by Symmetric Encryption and the aforementioned Symmetric Encryption Parameters. The Symmetric Encryption process generates an authentication code for each so encrypted message element, which is included in message elements.

The Symmetric Encryption Parameters are encrypted with Asymmetric Encryption using the recipient's public Asymmetric Encryption key and are another message element. A Digital Signature of the Symmetric Encryption Parameters is created using the sender's private Asymmetric Signature key and is also a message element. The message elements can be sent and stored separately, but must be available to a recipient to read such Message.

When a recipient receives a Message, the encrypted Symmetric Encryption Parameters message element is decrypted using an Asymmetric Encryption decrypter with the Asymmetric Encryption Parameters message element and the recipient's private asymmetric decryption key. If the Message was not intended for the recipient, then the decryption will fail. The sender's Digital Signature of Symmetric Encryption Parameters message element is checked using the sender's public Asymmetric Signature key, Digital Signature Parameters message element, and Symmetric Encryption Parameters to verify the sender is known to the recipient or to notify the recipient that the sender is unknown.

Before a Message is opened, the encrypted Message Rights message element must be first decrypted using a Symmetric Encryption decrypter with Message Rights authentication code message element and the aforementioned Symmetric Encryption Parameters. The authentication code ensures the integrity of the Message Rights. If the Message Rights have been tampered with, the decryption will fail. The Disposition of the Message is controlled by Message Rights, such as, deleting a Message after a date and time or requiring a password to open a Message. The Actions a recipient may take on a Message are limited by Message Rights, such as printing, copying, and forwarding.

To display message elements: Message Metadata, message body, and any message attachment, each must be first decrypted using a Symmetric Encryption decrypter with the associated authentication code message element and the aforementioned Symmetric Encryption Parameters. Each authentication code ensures the integrity of the associated message element. If the Message Metadata, message body, or any message attachment has been tampered with, the associated decryption will fail.

DETAILED DESCRIPTION OF DRAWINGS

FIG. 1 depicts an embodiment of creating symmetric encryption parameters 108 including:
(i) cipher name 101;
(ii) cipher mode 102, if any;
(iii) padding name 103, if any;
(iv) using a random number generator 104 to create an encryption key 105; and
(v) using a random number generator 106 to create an initialization vector 107
with continuations on FIGS. 3, 5 and 8.

Figure 2:
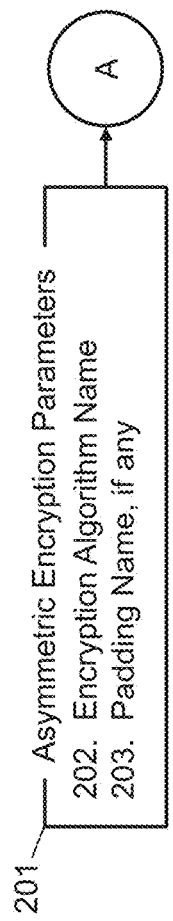
FIG. 2 depicts an embodiment of asymmetric encryption parameters including:
(i) encryption algorithm name; and
(ii) padding name, if any,
with continuations on FIG. 3 and FIG. 8.

FIG. 2 depicts an embodiment of asymmetric encryption parameters 201 including:
(i) encryption algorithm name 202; and
(ii) padding name 203, if any,
with continuations on FIG. 3 and FIG. 8.

Figure 3:
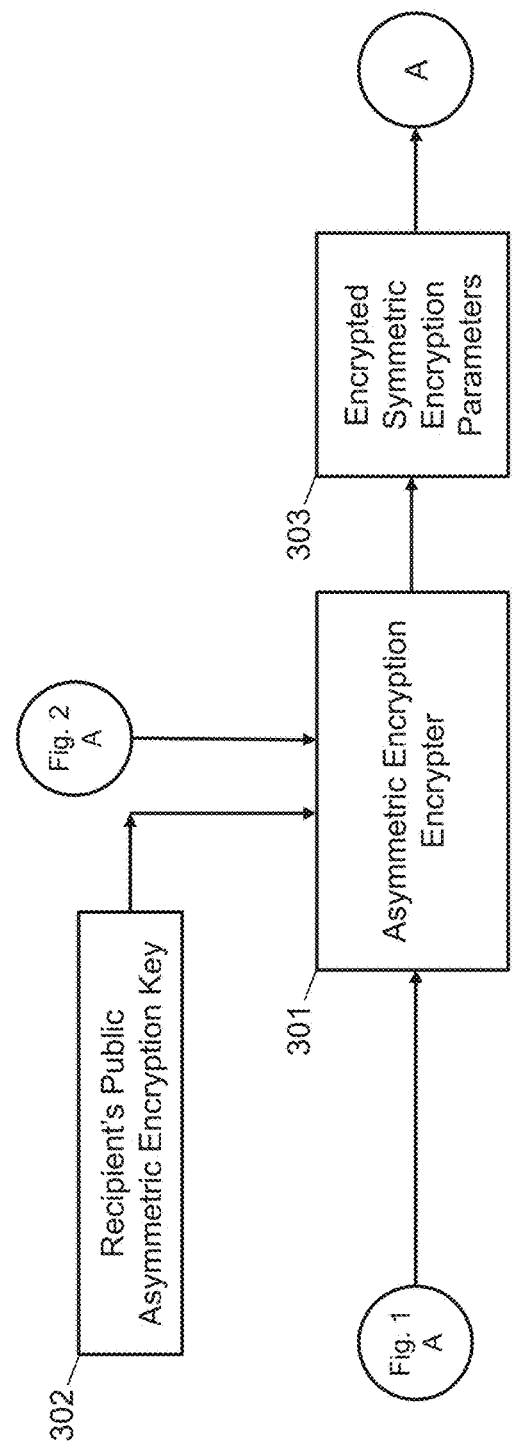
FIG. 3 depicts an embodiment of symmetric encryption parameters asymmetric encryption where symmetric encryption parameters, from continuation of the creating symmetric encryption parameters embodiment depicted in FIG. 1 designation A, are input to an asymmetric encryption encrypter with recipient's public asymmetric encryption key and asymmetric encryption parameters, from continuation of the asymmetric encryption parameters embodiment depicted in FIG. 2 designation A, resulting in encrypted symmetric encryption parameters with continuation on FIG. 8.
Figure 8:
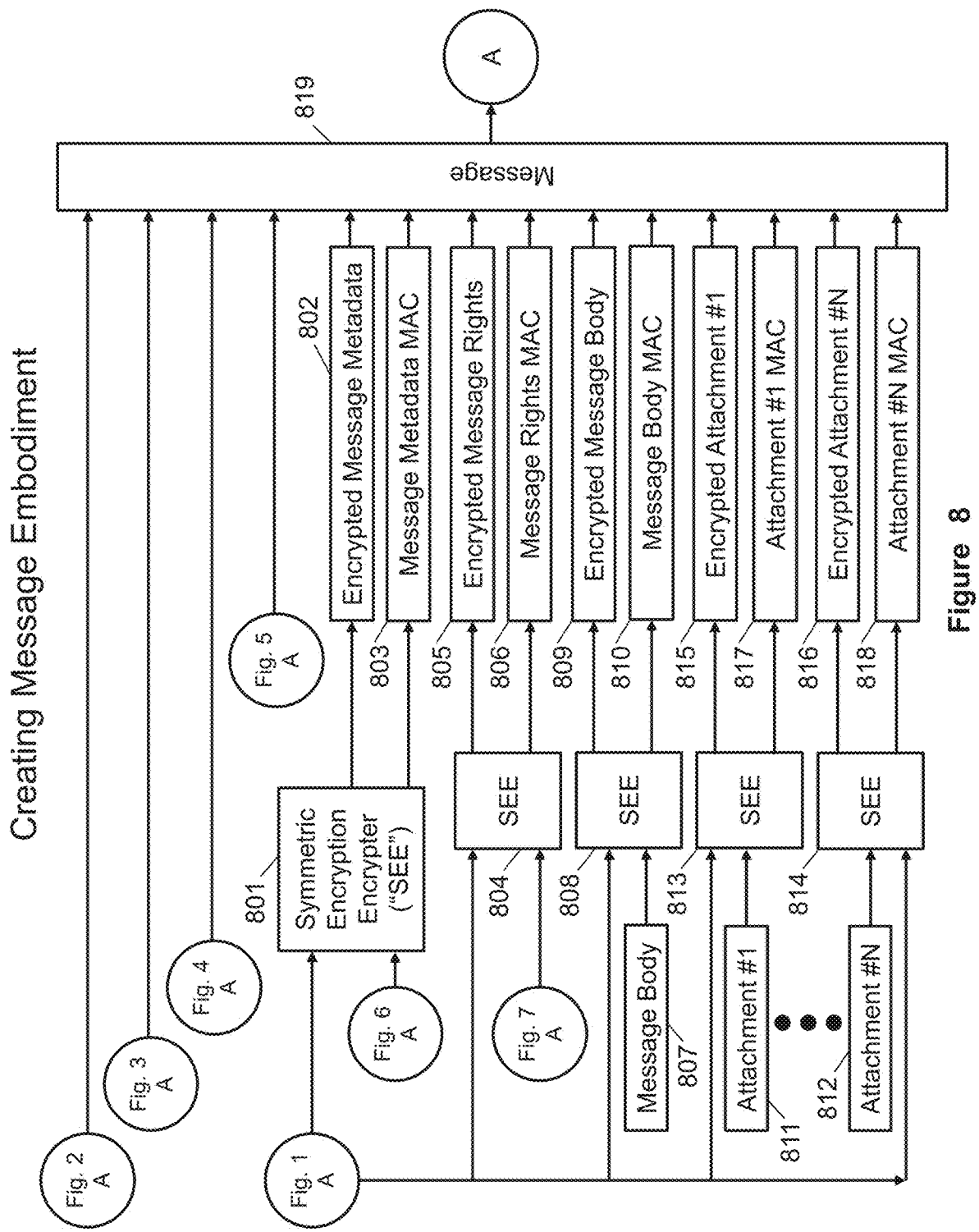
FIG. 8 depicts a list of message elements that taken together form a message, with an embodiment of creating message including:
- (i) asymmetric encryption parameters, from continuation of the asymmetric encryption parameters embodiment depicted in FIG. 2 designation A;
- (ii) encrypted symmetric encryption parameters, from continuation of the symmetric encryption parameters asymmetric encryption embodiment depicted in FIG. 3 designation A;
- (iii) digital signature parameters, from continuation of the digital signature parameters embodiment depicted in FIG. 4 designation A;
- (iv) sender's digital signature of symmetric encryption parameters, from continuation of the sender's digital signature embodiment depicted in FIG. 5 designation A;
- (v) encrypting message metadata, from continuation of the message metadata embodiment depicted in FIG. 6 designation A, using a symmetric encryption encrypter with symmetric encryption parameters, from creating symmetric encryption parameters embodiment depicted in FIG. 1 designation A, resulting in encrypted message metadata and message metadata authentication code;
- (vi) encrypting message rights, from continuation of the message rights embodiment depicted in FIG. 7 designation A, using a symmetric encryption encrypter with symmetric encryption parameters, from creating symmetric encryption parameters embodiment depicted in FIG. 1 designation A, resulting in encrypted message rights and message rights authentication code;
- (vii) encrypting message body, using a symmetric encryption encrypter with symmetric encryption parameters, from creating symmetric encryption parameters embodiment depicted in FIG. 1 designation A, resulting in encrypted message body and message body authentication code; and
- (viii) encrypting each message attachment, using a symmetric encryption encrypter with symmetric encryption parameters, from creating symmetric encryption parameters embodiment depicted in FIG. 1 designation A, resulting in each encrypted message attachment and message attachment authentication code with continuations on FIGS. 9, 10, 11, 12, 13, 15, and 16.

FIG. 3 depicts an embodiment of symmetric encryption parameters asymmetric encryption where Symmetric Encryption Parameters, from continuation of the creating symmetric encryption parameters embodiment depicted in FIG. 1 designation A, are input to an Asymmetric Encryption encrypter 301 with recipient's public Asymmetric Encryption key 302 and Asymmetric Encryption Parameters, from continuation of the asymmetric encryption parameters embodiment depicted in FIG. 2 designation A, resulting in encrypted Symmetric Encryption Parameters 303 with continuation on FIG. 8.

Figure 4:
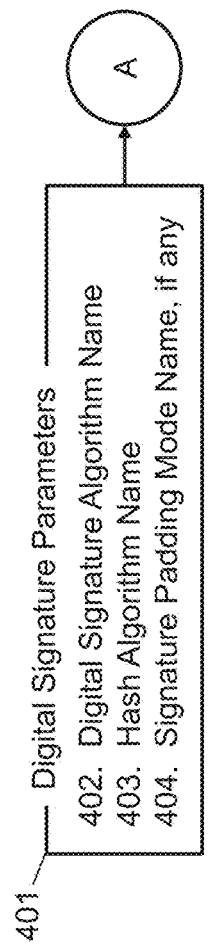
FIG. 4 depicts an embodiment of digital signature parameters including:
(i) digital signature algorithm name;
(ii) hash algorithm name; and
(iii) signature padding mode name, if any,
with continuations on FIG. 5 and FIG. 8.

FIG. 4 depicts an embodiment of digital signature parameters 401 including:
(i) Digital Signature algorithm name 402;
(ii) hash algorithm name 403; and
(iii) signature padding mode name 404, if any,
with continuations on FIG. 5 and FIG. 8.

Figure 5:
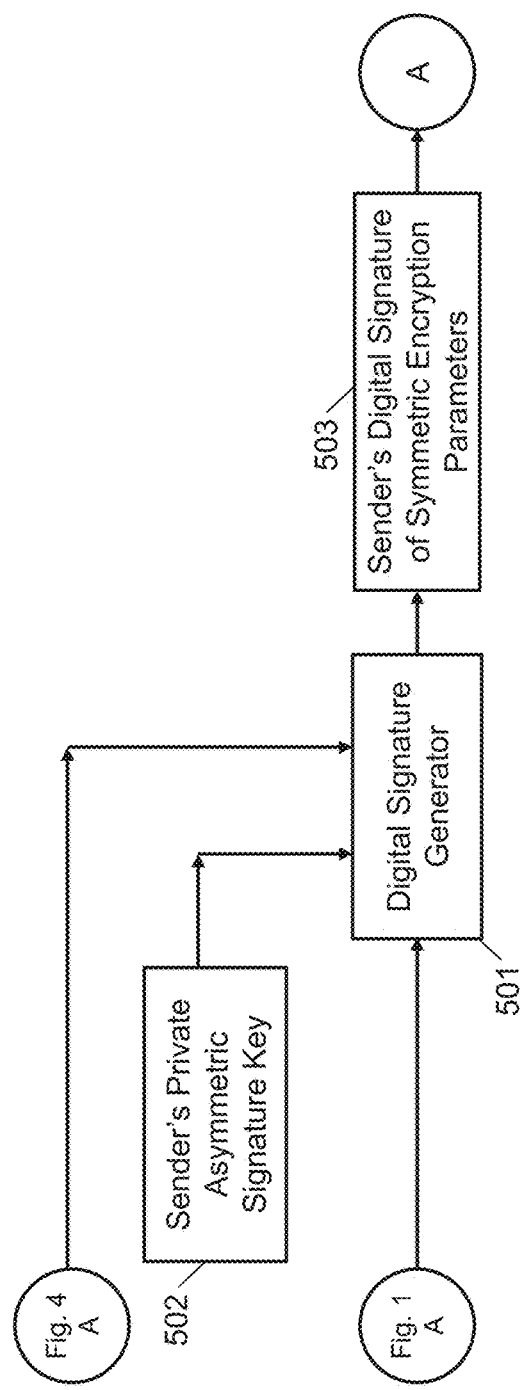
FIG. 5 depicts an embodiment of sender's digital signature where symmetric encryption parameters, from continuation of the creating symmetric encryption parameters embodiment depicted in FIG. 1 designation A, are input to a digital signature generator with sender's private asymmetric signature key and digital signature parameters, from continuation of the digital signature parameters embodiment depicted in FIG. 4 designation A, resulting in sender's digital signature of symmetric encryption parameters with continuation on FIG. 8.

FIG. 5 depicts an embodiment of sender's digital signature where Symmetric Encryption Parameters, from continuation of the creating symmetric encryption parameters embodiment depicted in FIG. 1 designation A, are input to a Digital Signature generator 501 with sender's private Asymmetric Signature key 502 and Digital Signature Parameters, from continuation of the digital signature parameters embodiment depicted in FIG. 4 designation A, resulting in sender's Digital Signature of Symmetric Encryption Parameters 503 with continuation on FIG. 8.

Figure 6:
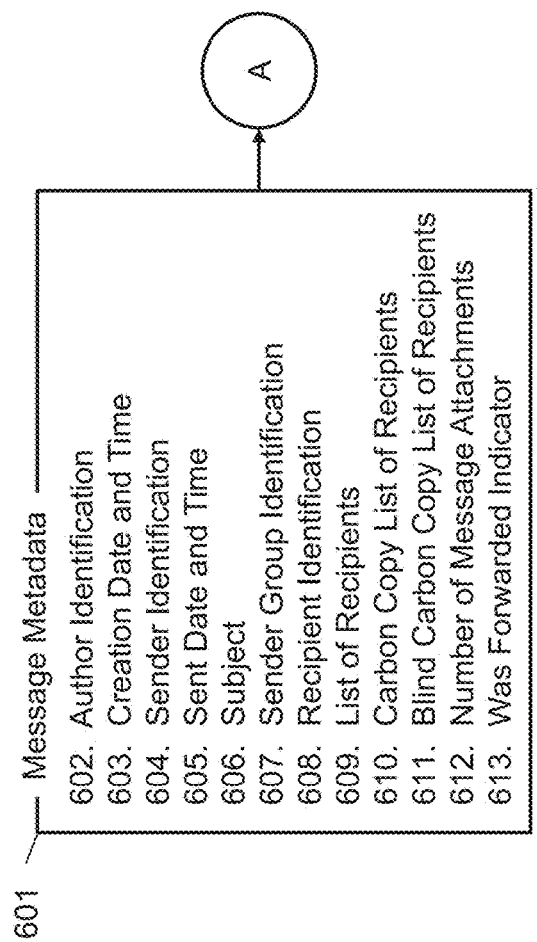
FIG. 6 depicts an embodiment of message metadata including:
(i) author identification;
(ii) creation date and time;
(iii) sender identification;
(iv) sent date and time;
(v) subject;
(vi) sender group identification;
(vii) recipient identification;
(viii) list of recipients;
(ix) carbon copy list of recipients;
(x) blind carbon copy list of recipients;
(xi) number of message attachments; and
(xii) indicator whether message was forwarded or not
with continuation on FIG. 8.

FIG. 6 depicts an embodiment of message metadata 601 including:
(i) author identification 602;
(ii) creation date and time 603;
(iii) sender identification 604;
(iv) sent date and time 605;
(v) subject 606;
(vi) sender group identification 607;
(vii) recipient identification 608;
(viii) list of recipients 609;
(ix) carbon copy list of recipients 610;
(x) blind carbon copy list of recipients 611;
(xi) number of message attachments 612; and
(xii) indicator whether message was forwarded or not 613
with continuation on FIG. 8.

Figure 7:
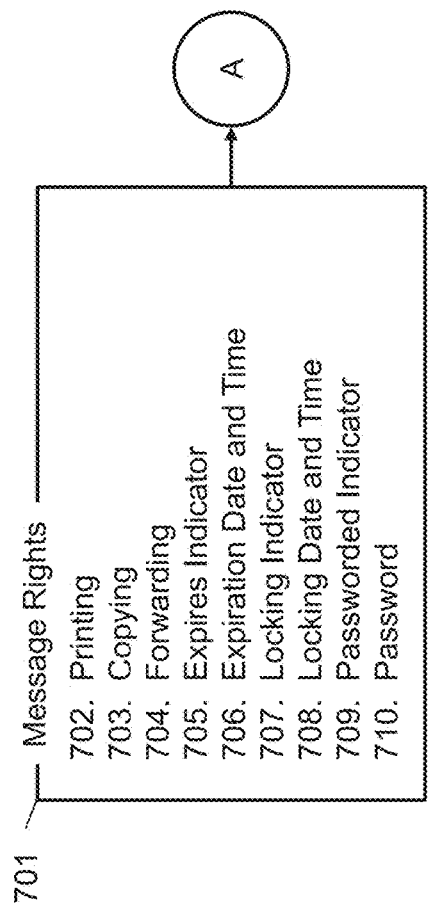
FIG. 7 depicts an embodiment of message rights including, but not limited to:
(i) printing;
(ii) copying;
(iii) forwarding;
(iv) indicator whether message expires or not;
(v) expiration date and time;
(vi) indicator whether message locks or not;
(vii) locking date and time;
(viii) indicator whether message is passworded or not; and
(ix) password
with continuation on FIG. 8.

FIG. 7 depicts an embodiment of message rights 701 including, but not limited to:
(i) printing 702;
(ii) copying 703;
(iii) forwarding 704;
(iv) indicator whether message expires or not 705;
(v) expiration date and time 706;
(vi) indicator whether message locks or not 707;
(vii) locking date and time 708;
(viii) indicator whether message is passworded or not 709; and
(ix) password 710
with continuation on FIG. 8.

FIG. 8 depicts an embodiment of creating message 819 including:
(i) Asymmetric Encryption Parameters, from continuation of the asymmetric encryption parameters embodiment depicted in FIG. 2 designation A;
(ii) encrypted Symmetric Encryption Parameters, from continuation of the symmetric encryption parameters asymmetric encryption embodiment depicted in FIG. 3 designation A;
(iii) Digital Signature Parameters, from continuation of the digital signature parameters embodiment depicted in FIG. 4 designation A;
(iv) sender's Digital Signature of Symmetric Encryption Parameters, from continuation of the sender's digital signature embodiment depicted in FIG. 5 designation A;
(v) encrypting Message Metadata, from continuation of the message metadata embodiment depicted in FIG. 6 designation A, using a Symmetric Encryption encrypter 801 with Symmetric Encryption Parameters, from creating symmetric encryption parameters embodiment depicted in FIG. 1 designation A, resulting in encrypted Message Metadata 802 and Message Metadata authentication code 803;
(vi) encrypting Message Rights, from continuation of the message rights embodiment depicted in FIG. 7 designation A, using a Symmetric Encryption encrypter 804 with Symmetric Encryption Parameters, from creating symmetric encryption parameters embodiment depicted in FIG. 1 designation A, resulting in encrypted Message Rights 805 and Message Rights authentication code 806;
(vii) encrypting message body 807, using a Symmetric Encryption encrypter 808 with Symmetric Encryption Parameters, from creating symmetric encryption parameters embodiment depicted in FIG. 1 designation A, resulting in encrypted message body 809 and message body authentication code 810; and
(viii) encrypting each message attachment 811, 812, using a Symmetric Encryption encrypter 813, 814 with Symmetric Encryption Parameters, from creating symmetric encryption parameters embodiment depicted in FIG. 1 designation A, resulting in each encrypted message attachment 815, 816 and message attachment authentication code 817, 818
with continuations on FIGS. 9, 10, 11, 12, 13, 15, and 16.

Figure 9:
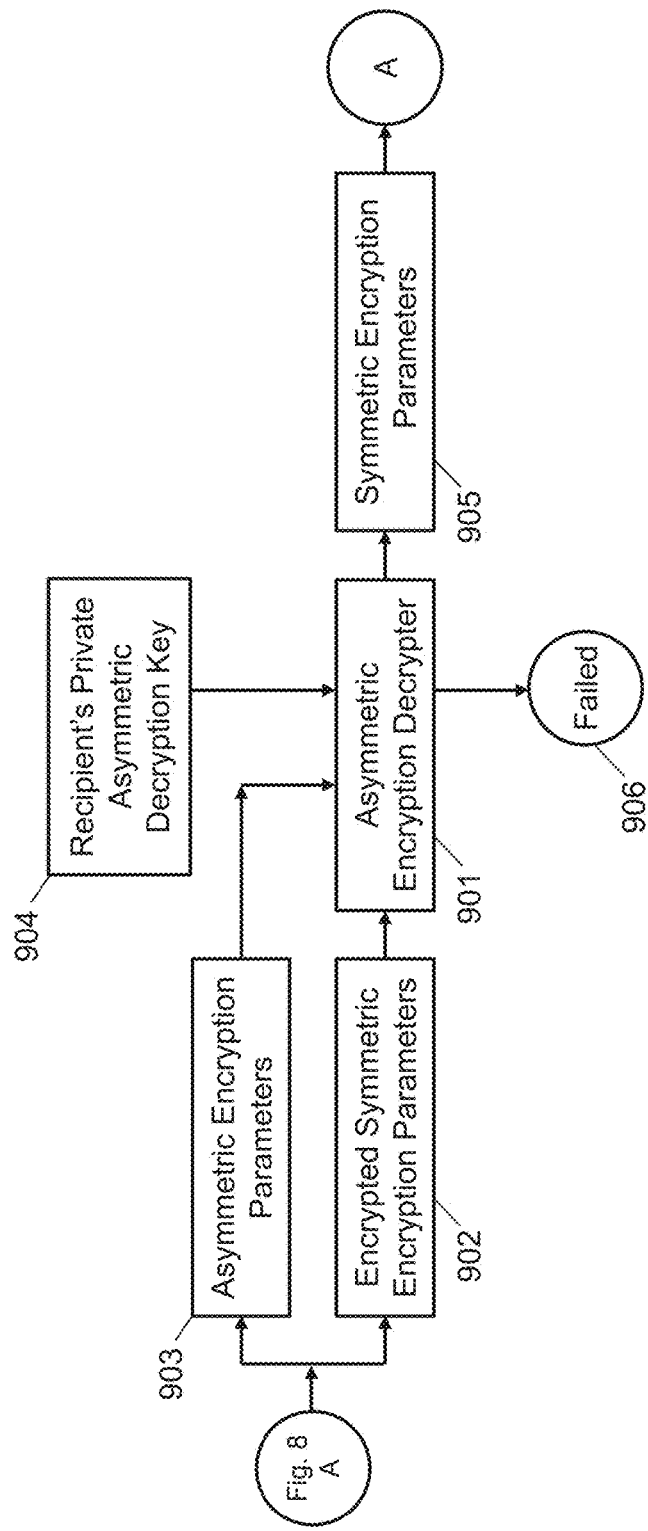
FIG. 9 depicts an embodiment of decrypting encrypted symmetric encryption parameters where an asymmetric encryption decrypter decrypts encrypted symmetric encryption parameters, obtained from continuation of the creating message embodiment depicted in FIG. 8 designation A, with:
- (i) the recipient's private asymmetric decryption key corresponding to the recipient's public asymmetric encryption key that was first used to encrypt symmetric encryption parameters; and
- (ii) asymmetric encryption parameters, obtained from continuation of the creating message embodiment depicted in FIG. 8 designation A, resulting in symmetric encryption parameters with continuations on FIGS. 10, 11, 12, 13, and 16 or decryption fails.

FIG. 9 depicts an embodiment of decrypting encrypted symmetric encryption parameters where an Asymmetric Encryption decrypter 901 decrypts encrypted Symmetric Encryption Parameters 902, obtained from continuation of the creating message embodiment depicted in FIG. 8 designation A, with:
  (i) the recipient's private asymmetric decryption key 904 corresponding to the recipient's public asymmetric encryption key that was first used to encrypt Symmetric Encryption Parameters; and
  (ii) Asymmetric Encryption Parameters 903, obtained from continuation of the creating message embodiment depicted in FIG. 8 designation A,
resulting in Symmetric Encryption Parameters 905 with continuation on FIGS. 10, 11, 12, 13, and 16 or decryption fails 906.

Figure 10:
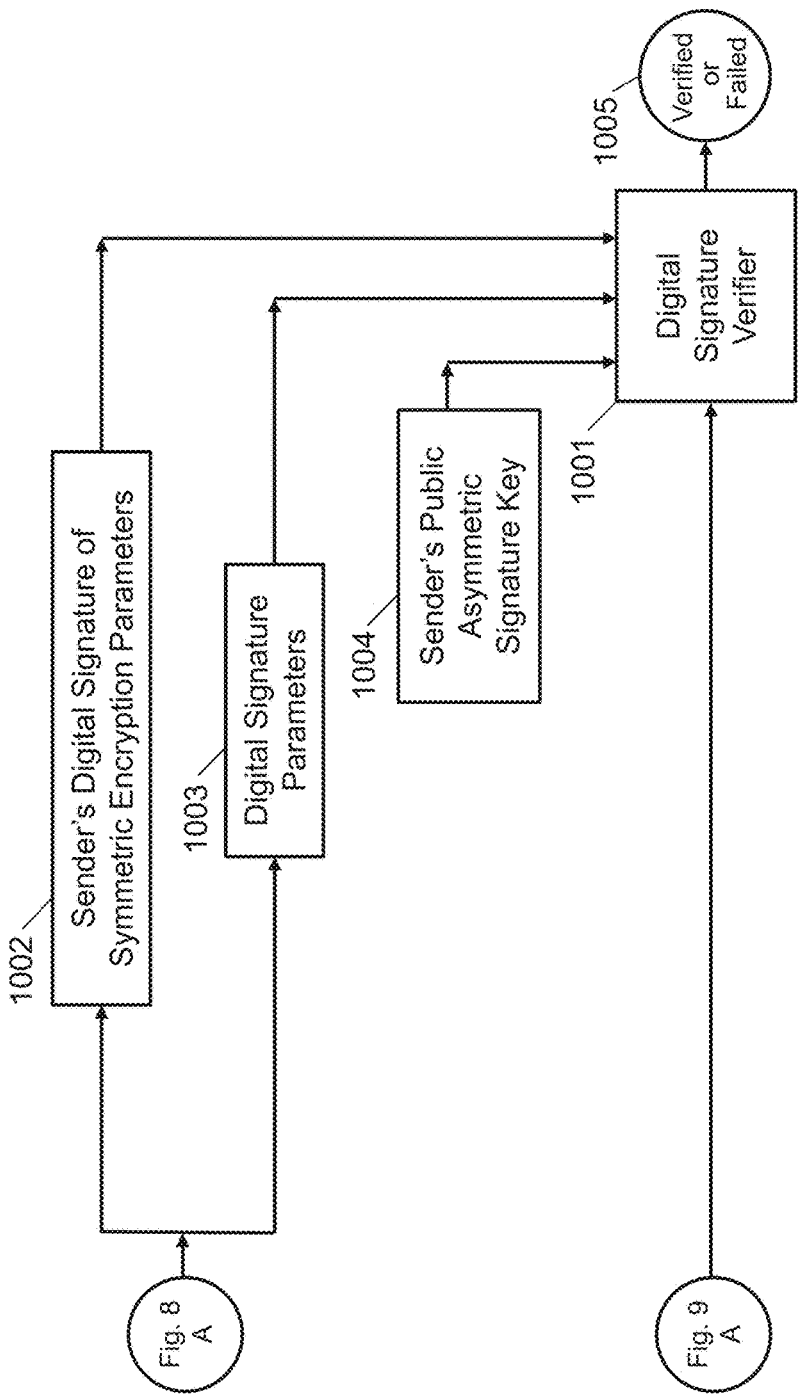
FIG. 10 depicts an embodiment of sender authentication, using a digital signature verifier with:
- (i) sender's digital signature of symmetric encryption parameters, obtained from the continuation of creating message embodiment depicted in FIG. 8 designation A;
- (ii) digital signature parameters, obtained from the continuation of creating message embodiment depicted in FIG. 8 designation A;
- (iii) sender's public asymmetric signature key corresponding to the sender's private asymmetric signature key that was first used to sign symmetric encryption parameters; and
- (iv) symmetric encryption parameters from the continuation of decrypting encrypted symmetric encryption parameters depicted in FIG. 9 designation A, to verify sender's digital signature of symmetric encryption parameters or indicate failure.

FIG. 10 depicts an embodiment of sender authentication, using a Digital Signature verifier 1001 with:
  (i) sender's Digital Signature of Symmetric Encryption Parameters 1002, obtained from the continuation of creating message embodiment depicted in FIG. 8 designation A;
  (ii) Digital Signature Parameters 1003, obtained from the continuation of creating message embodiment depicted in FIG. 8 designation A;
  (iii) sender's public Asymmetric Signature key 1004 corresponding to the sender's private Asymmetric Signature key that was first used to sign Symmetric Encryption Parameters; and
  (iv) Symmetric Encryption Parameters from the continuation of decrypting encrypted symmetric encryption parameters depicted in FIG. 9 designation A,
to verify sender's Digital Signature of Symmetric Encryption Parameters or indicate failure 1005.

Figure 11:
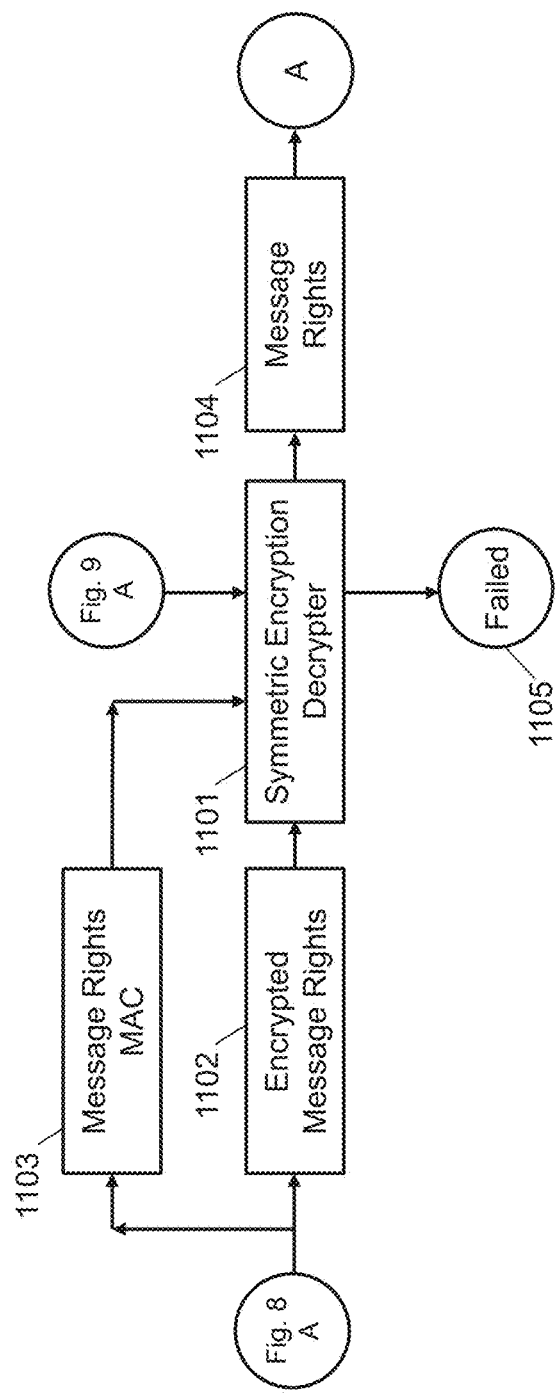
FIG. 11 depicts an embodiment of decrypting encrypted message rights, using a symmetric encryption decrypter with:
- (i) encrypted message rights, obtained from the continuation of creating message embodiment depicted in FIG. 8 designation A;
- (ii) message rights authentication code, obtained from the continuation of creating message embodiment depicted in FIG. 8 designation A; and
- (iii) symmetric encryption parameters from the continuation of decrypting encrypted symmetric encryption parameters embodiment depicted in FIG. 9 designation A, resulting in message rights with continuations on FIG. 14 and FIG. 15 or decryption fails.

FIG. 11 depicts an embodiment of decrypting encrypted message rights, using a Symmetric Encryption decrypter 1101 with:
  (i) encrypted Message Rights 1102, obtained from the continuation of creating message embodiment depicted in FIG. 8 designation A;
  (ii) Message Rights authentication code 1103, obtained from the continuation of creating message embodiment depicted in FIG. 8 designation A; and
  (iii) Symmetric Encryption Parameters from the continuation of decrypting encrypted symmetric encryption parameters embodiment depicted in FIG. 9 designation A,
resulting in Message Rights 1104 with continuations on FIG. 14 and FIG. 15 or decryption fails 1105.

Figure 12:
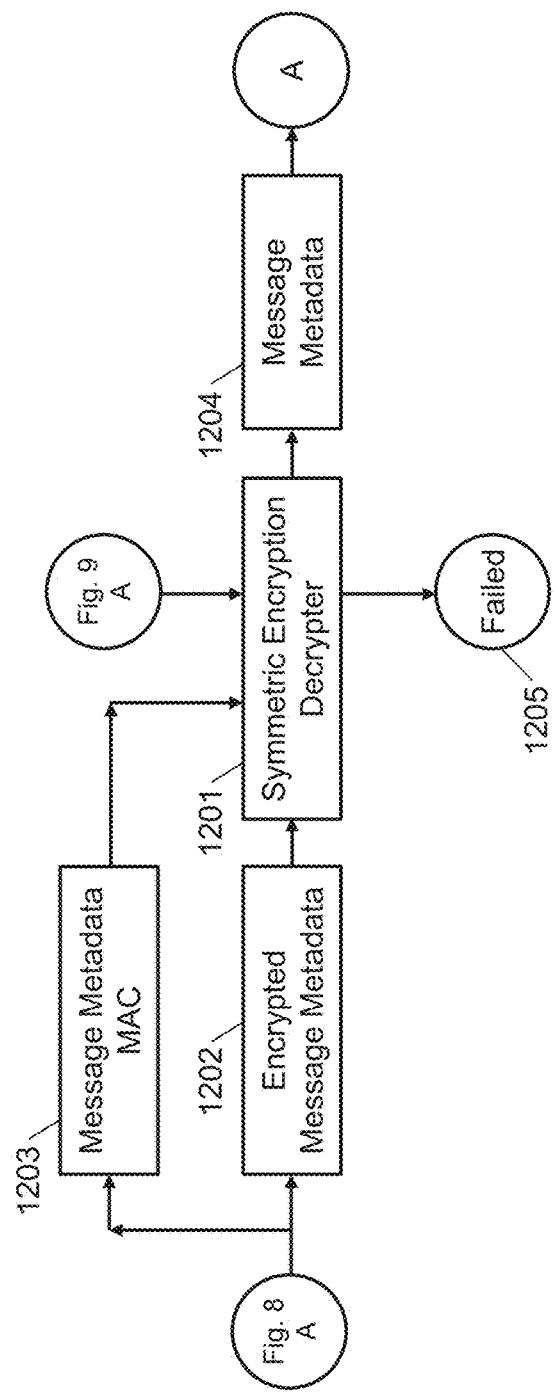
FIG. 12 depicts an embodiment of decrypting encrypted message metadata, using a symmetric encryption decrypter with:
- (i) encrypted message metadata, obtained from the continuation of creating message embodiment depicted in FIG. 8 designation A;
- (ii) message metadata authentication code, obtained from the continuation of creating message embodiment depicted in FIG. 8 designation A; and
- (iii) symmetric encryption parameters from the continuation of decrypting encrypted symmetric encryption parameters embodiment depicted in FIG. 9 designation A, resulting in message metadata with continuation on FIG. 15 or decryption fails.

FIG. 12 depicts an embodiment of decrypting encrypted message metadata, using a Symmetric Encryption decrypter 1201 with:
  (i) encrypted Message Metadata 1202, obtained from the continuation of creating message embodiment depicted in FIG. 8 designation A;
  (ii) Message Metadata authentication code 1203, obtained from the continuation of creating message embodiment depicted in FIG. 8 designation A; and
  (iii) Symmetric Encryption Parameters from the continuation of decrypting encrypted symmetric encryption parameters embodiment depicted in FIG. 9 designation A,
resulting in Message Metadata 1204 with continuation on FIG. 15 or decryption fails 1205.

Figure 13:
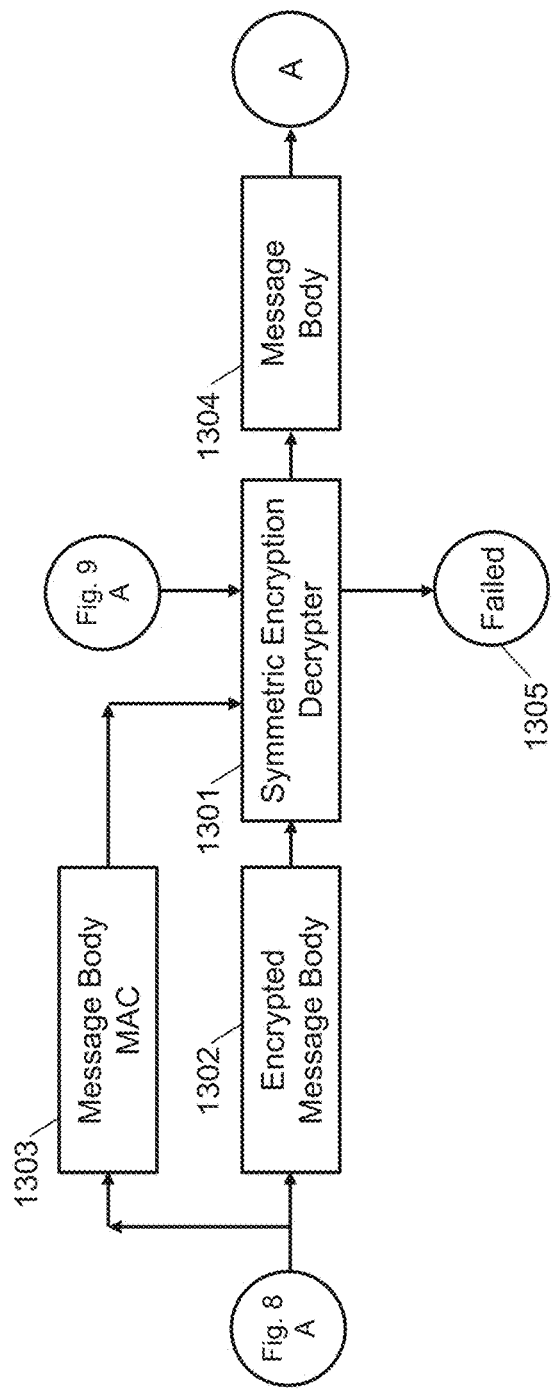
FIG. 13 depicts an embodiment of decrypting encrypted message body, using a symmetric encryption decrypter with:
- (i) encrypted message body, obtained from the continuation of creating message embodiment depicted in FIG. 8 designation A;
- (ii) message body authentication code, obtained from the continuation of creating message embodiment depicted in FIG. 8 designation A; and
- (iii) symmetric encryption parameters from the continuation of decrypting encrypted symmetric encryption parameters embodiment depicted in FIG. 9 designation A, resulting in message body with continuation on FIG. 15 or decryption fails.

FIG. 13 depicts an embodiment of decrypting encrypted message body, using a Symmetric Encryption decrypter 1301 with:
  (i) encrypted Message body 1302, obtained from the continuation of creating message embodiment depicted in FIG. 8 designation A;
  (ii) Message body authentication code 1303, obtained from the continuation of creating message embodiment depicted in FIG. 8 designation A; and
  (iii) Symmetric Encryption Parameters from the continuation of decrypting encrypted symmetric encryption parameters embodiment depicted in FIG. 9 designation A,
resulting in Message body 1304 with continuation on FIG. 15 or decryption fails 1305.

Figure 14:
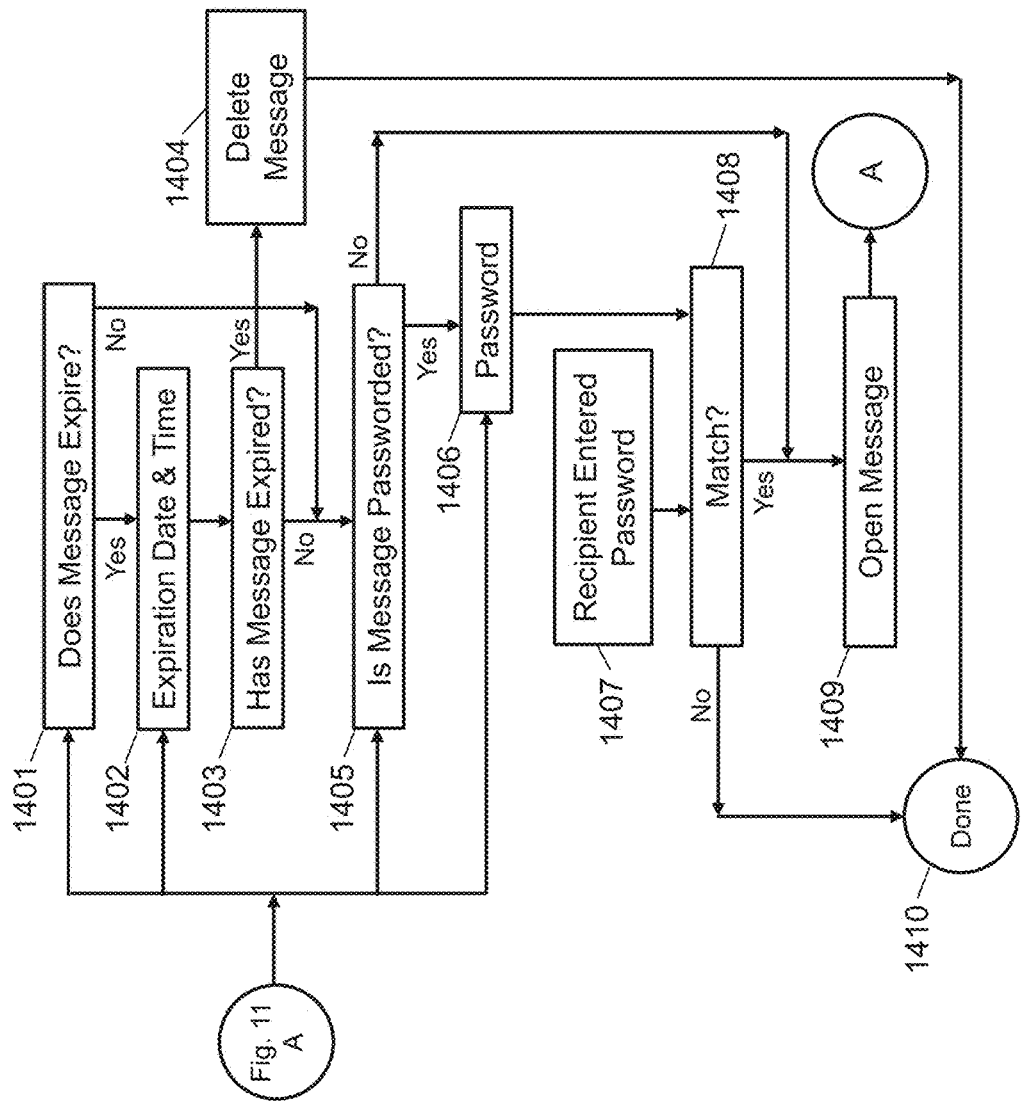
FIG. 14 shows a flowchart of opening message after obtaining message rights from the continuation of decrypting encrypted message rights embodiment depicted in FIG. 11 designation A and if message expiration right is set, the expiration date and time are compared to the current date and time to determine if the message has expired and if it has expired then delete message and thereby done with the attempt to open the message; if message expiration right is not set or the message hasn't expired, and if message password right is set, compare password to recipient entered password, where a match allows the message to be opened with continuation on FIG. 15 or otherwise done with the attempt to open the message; and if message password right is not set then open the message with continuation on FIG. 15.
Figure 15:
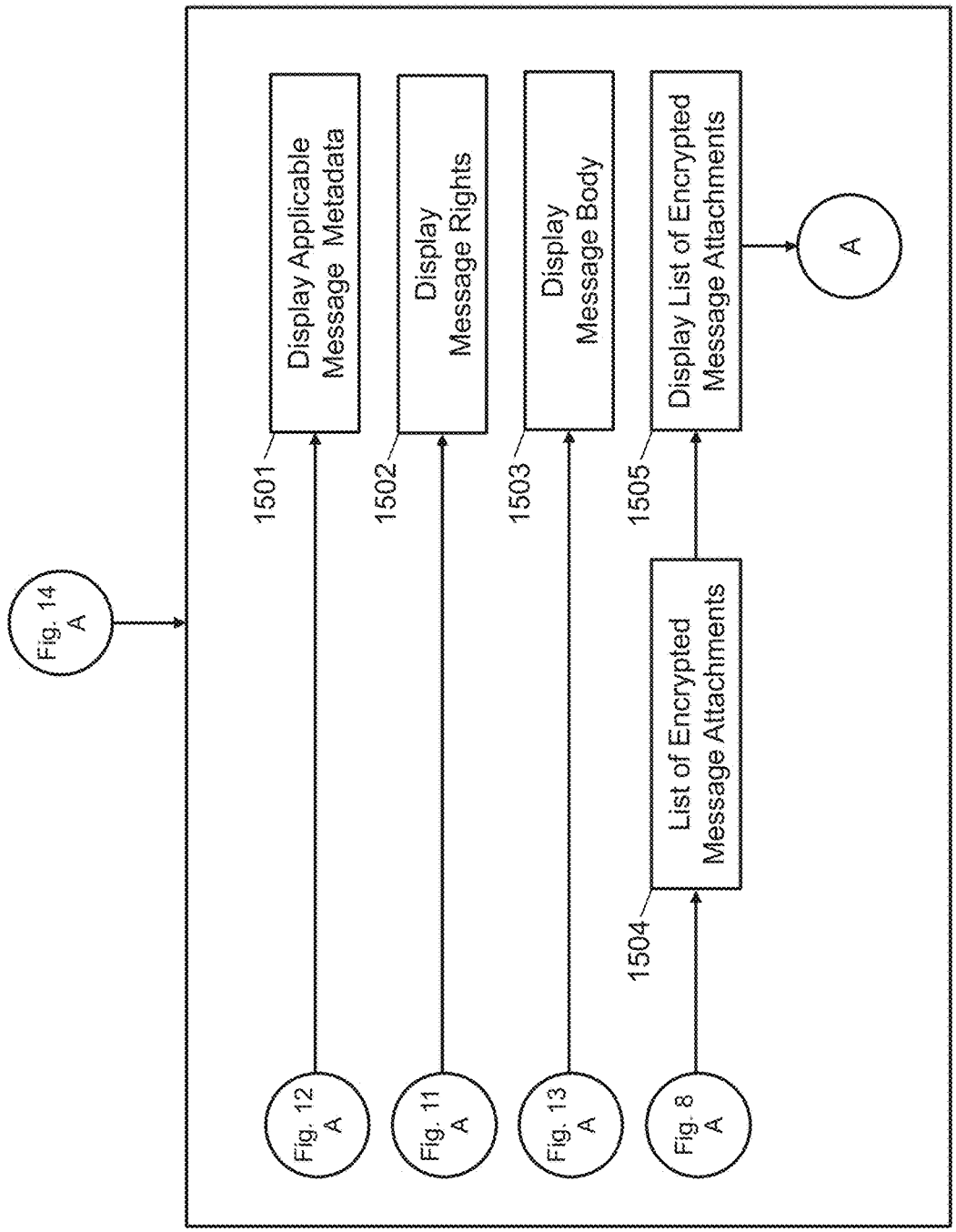
FIG. 15 depicts an embodiment of message display after opening a message from the continuation of opening message flowchart depicted in FIG. 14 designation A, where:
  (i) applicable message metadata from continuation of decrypting encrypted message metadata embodiment depicted in FIG. 12 designation A is displayed;
  (ii) message rights from continuation of decrypting encrypted message rights embodiment depicted in FIG. 11 designation A are displayed;
  (iii) message body from continuation of decrypting encrypted message body embodiment depicted in FIG. 13 designation A is displayed; and
  (iv) a list of encrypted message attachments is created from continuation of creating message embodiment depicted in FIG. 8 designation A and displayed
with continuation on FIG. 16.

FIG. 14 shows a flowchart of opening message after obtaining Message Rights from the continuation of decrypting encrypted message rights embodiment depicted in FIG. 11 designation A and if Message expiration right 1401 is set, the expiration date and time 1402 are compared to the current date and time to determine if the Message has expired 1403 and if it has expired 1403 then delete Message 1404 and thereby done 1410 with the attempt to open the Message; if Message expiration right 1401 is not set or the Message hasn't expired 1403, and if Message password right 1405 is set, compare password 1406 to recipient entered password 1407, where a match 1408 allows the Message to be opened 1409 with continuation on FIG. 15 or otherwise done 1410 with the attempt to open the Message; and if Message password right 1405 is not set then open the Message with continuation on FIG. 15.

FIG. 15 depicts an embodiment of message display after opening a message from the continuation of opening message flowchart depicted in FIG. 14 designation A, where:
  (i) applicable Message Metadata from continuation of decrypting encrypted message metadata embodiment depicted in FIG. 12 designation A is displayed 1501;
  (ii) Message Rights from continuation of decrypting encrypted message rights embodiment depicted in FIG. 11 designation A are displayed 1502;
  (iii) Message body from continuation of decrypting encrypted message body embodiment depicted in FIG. 13 designation A is displayed 1503; and
  (iv) a list of encrypted message attachments 1504 is created from continuation of creating message embodiment depicted in FIG. 8 designation A and displayed 1505
with continuation on FIG. 16.

Figure 16:
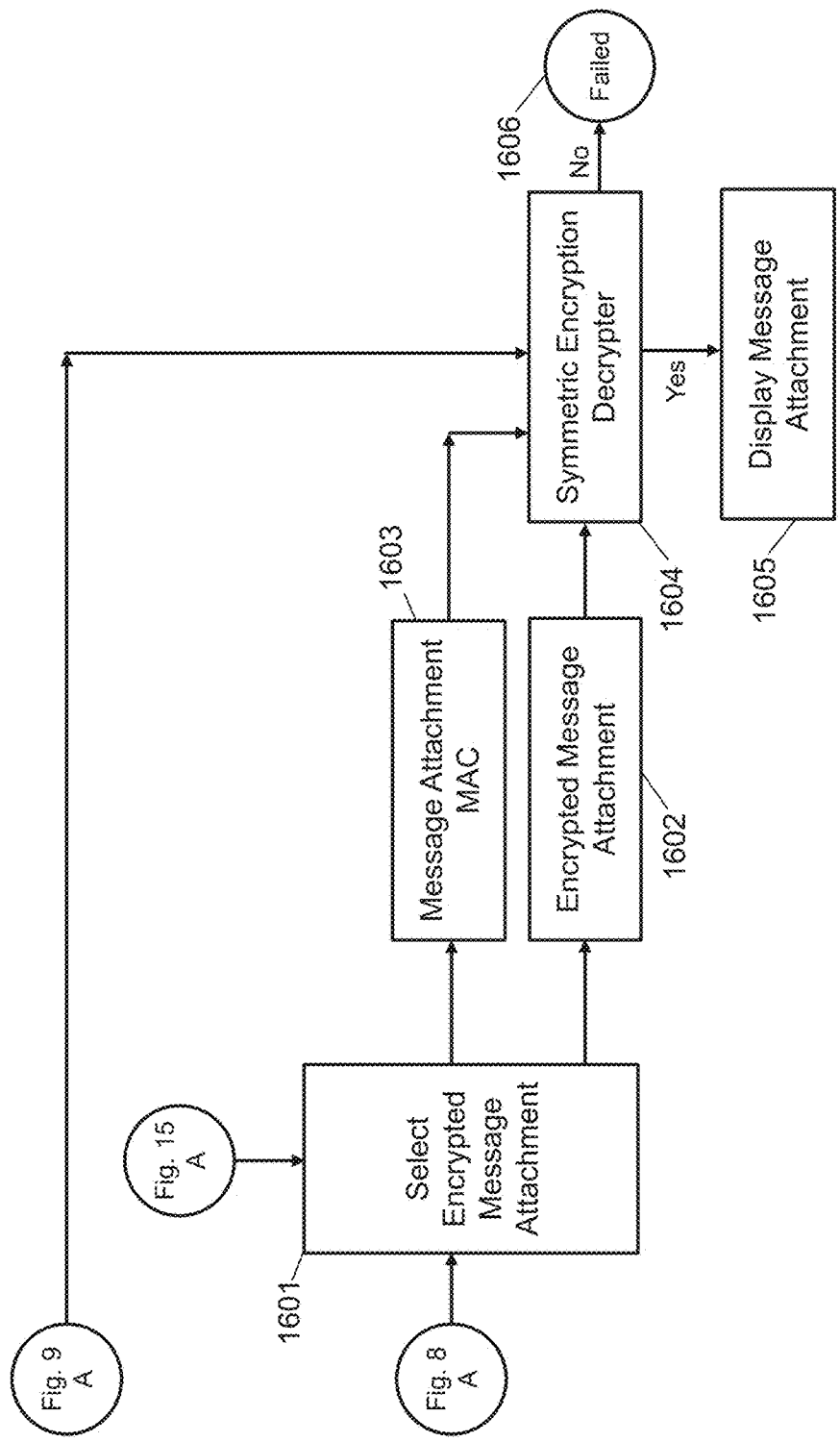
FIG. 16 depicts an embodiment of message attachment display, where selecting an encrypted message attachment from the displayed list of encrypted message attachments, from continuation of message display embodiment depicted in of FIG. 15 designation A, is used to obtain the encrypted message attachment and message attachment authentication code, from continuation of creating message embodiment depicted in FIG. 8 designation A, and input to a symmetric encryption decrypter with symmetric encryption parameters, from continuation of decrypting encrypted symmetric encryption parameters embodiment depicted in FIG. 9 designation A, and encrypted message attachment is successfully decrypted and displayed, or decryption fails.

FIG. 16 depicts an embodiment of message attachment display, where selecting an encrypted message attachment 1601 from the displayed list of encrypted message attachments, from continuation of message display embodiment depicted in of FIG. 15 designation A, is used to obtain the encrypted message attachment 1602 and message attachment authentication code 1603, from continuation of creating message embodiment depicted in FIG. 8 designation A, and input to a Symmetric Encryption decrypter 1604 with Symmetric Encryption Parameters, from continuation of decrypting encrypted symmetric encryption parameters embodiment depicted in FIG. 9 designation A, and encrypted message attachment is successfully decrypted and displayed 1605, or decryption fails 1606.

FIG. 17 shows an illustration of the maximum symmetric encryption parameters data size 1704 that can be encrypted by a RSA encryption algorithm or General Encryption Enhancement ("GEE") enhanced RSA version 1701 with various effective key sizes 1702 and encryption padding types 1703 and the encrypted data security level achieved 1705.

The invention claimed is:

1. A system for exchanging secure, confidential, authenticated, integrity-checked, and controlled messages between a first entity and a plurality of entities, comprising:
   at least one processor executing instructions providing;
   a data transport mechanism;
   an encryption mechanism adapted to encrypt applicable message elements independently;
   a digital signature mechanism;
   software operating on one or more processors wherein said software is adapted to compose, encrypt, decrypt, save, download, and stream messages;
   the system having an input means for the first entity and a plurality of entities, each entity having access to a computing device having said software that is adapted to execute instructions and send instructions to said software related to message comprising creation, encrypting, decrypting, sending, receiving, reading, displaying, deleting, and management;
   wherein to send a message from the first entity to a plurality of entities, a sender and each recipient operate said software to facilitate the following steps:
   the system provides an interface for the sender to compose a message using or instructing said software, and makes the message available to the recipient;
   the system allows the recipient to receive message elements;
   the system allows the recipient to decrypt encrypted symmetric encryption parameters, provided recipient has access to the private key associated with the intended recipient's public key that was first used to encrypt symmetric encryption parameters; and
   the system allows the recipient to read applicable decrypted message elements, if permitted by message rights;
   wherein the system creates symmetric encryption parameters, comprising: a cipher name, cipher mode if any, padding name if any, a randomly generated encryption key, and a randomly generated encryption initialization vector, that are encrypted to form a message element.

2. The system of claim 1, wherein said message elements include:
   a) asymmetric encryption parameters;
   b) digital signature parameters;
   c) sender's digital signature of symmetric encryption parameters;
   d) encrypted symmetric encryption parameters;
   e) encrypted message metadata and message metadata authentication code;
   f) encrypted message rights and message rights authentication code;
   g) encrypted message body and message body authentication code; and
   h) any encrypted message attachments and their associated authentication codes.

3. The system of claim 2, wherein the system encrypts symmetric encryption parameters using an asymmetric encryption encrypter with recipient's public asymmetric encryption key and said asymmetric encryption parameters forming said encrypted symmetric encryption parameters.

4. The system of claim 2, wherein the system creates said sender's digital signature of symmetric encryption parameters using a digital signature generator with sender's private asymmetric signature key and said digital signature parameters.

5. The system of claim 2, wherein the system uses at least one symmetric encryption encrypter with symmetric encryption parameters to independently encrypt and generate an authentication code for each of message metadata, message rights, message body, and any message attachment resulting in said encrypted message metadata and message metadata authentication code, said encrypted message rights and message rights authentication code, said encrypted message body and message body authentication code, and said any encrypted message attachments and their associated authentication codes.

6. The system of claim 1, wherein the system makes said message elements available to a recipient, by sending said message to data storage for later download, streaming, or in operation of said software by a recipient.

7. The system of claim 1, wherein said message elements when sent/received, travel separately or together to/from data storage.

8. The system of claim 1, wherein the system forbids:
   a) inclusion of obfuscated hyperlinks in message body; and
   b) executable message attachments.

9. The system of claim 1, wherein the system authenticates said sender of said message using a digital signature verifier with:
   a) the sender's digital signature of symmetric encryption parameters, obtained from message elements;
   b) the sender's public asymmetric signature key corresponding to the sender's private asymmetric signature key first used to create said sender's digital signature;
   c) digital signature parameters, first used to create the sender's digital signature, obtained from message elements; and
   d) symmetric encryption parameters, after decrypting the encrypted symmetric encryption parameters obtained from message elements, using an asymmetric encryption decrypter with asymmetric encryption parameters obtained from message elements and recipient's private asymmetric decryption key.

10. The system of claim 1, wherein the system opens the message after:
    a) decrypting encrypted symmetric encryption parameters obtained from message elements, using a asymmetric encryption decrypter with asymmetric encryption parameters obtained from message elements and the recipient's private asymmetric decryption key to form symmetric encryption parameters;
    b) decrypting encrypted message rights obtained from message elements using symmetric encryption decrypter with said symmetric encryption parameters and message rights authentication code obtained from message elements to form message rights; and
    c) enforcing applicable said message rights.

11. The system of claim 1, wherein the message recipient cannot alter message rights.

12. The system of claim 1, wherein said message is controlled through enforcement of said message rights that were set by original message author for all recipients regardless if said message has been modified, augmented, and/or forwarded.

13. The system of claim 12, wherein actions taken on said message are controlled according to said message rights that comprise any viewing, printing, copying, forwarding, deleting of message elements before forwarding, altering of message elements before forwarding, and augmenting message before forwarding.

14. The system of claim 12, wherein disposition of said message is controlled according to said message rights that comprise any password required to open said message, deleting, deletion of said message after a particular date or date and time, deletion of said message after a permitted number of views, locking, locking said message to disable opening after a particular date or date and time, and locking said message to disable opening after a permitted number of views.

15. The system of claim 14, wherein the message cannot be opened without a correct password.

16. The system of claim 14, wherein the message is deleted after:
   a) a particular date;
   b) a particular date and time; or
   c) after a permitted number of views is reached.

17. The system of claim 14, wherein the message is locked after:
   a) a particular date;
   b) a particular date and time; or
   c) after a permitted number of views is reached.

18. The system of claim 1 wherein said software operating on one or more processors
   comprises remote software, wherein said remote software operates remotely from entities sending instructions to said remote software.

19. The system of claim 1, wherein the system uses a software program adapted to provide an interface for said sender and each recipient.

20. The system of claim 19, wherein the software program adapted to provide an interface comprises a web browser.

21. A system for exchanging secure, confidential, authenticated, integrity-checked, and controlled messages between a first entity and a plurality of entities, comprising:
   at least one processor coupled with memory executing instructions providing;
   a data transport mechanism;
   an encryption mechanism adapted to decrypt applicable message elements independently;
   a digital signature mechanism;
   software operating on one or more processors wherein said software is adapted to compose, encrypt, decrypt, save, download, and stream messages;
   the system having an input means for the first entity and a plurality of entities, each entity having access to a computing device having said software that is adapted to execute instructions and send instructions to said software related to message comprising creation, encrypting, decrypting, sending, receiving, reading, displaying, deleting, and management;
   wherein to send a message from the first entity to a plurality of entities, a sender and each recipient operate said software to facilitate the following steps:
   the system provides an interface for the sender to compose a message using or instructing said software, and makes the message available to the recipient;
   the system allows the recipient to receive message elements;
   the system allows the recipient to decrypt encrypted symmetric encryption parameters, provided recipient has access to the private key associated with the intended recipient's public key that was first used to encrypt symmetric encryption parameters; and
   the system allows the recipient to read applicable decrypted message elements, if permitted by message rights;
   wherein the system opens the message after:
   a) decrypting encrypted symmetric encryption parameters obtained from message elements, using an asymmetric encryption decrypter with asymmetric encryption parameters obtained from message elements and the recipient's private asymmetric decryption key to form symmetric encryption parameters first generated during message creation comprising: a cipher name, cipher mode if any, padding name if any, an encryption key, and an encryption initialization vector;
   b) decrypting encrypted message rights obtained from message elements using symmetric encryption decrypter with said symmetric encryption parameters and message rights authentication code obtained from message elements to form message rights; and
   c) enforcing applicable said message rights,
   wherein said system opens the message and further displays:
   a) a list of encrypted message attachments from message elements;
   b) said message rights;
   c) applicable message metadata, after decrypting encrypted message metadata obtained from message elements using symmetric encryption decrypter with said symmetric encryption parameters and message metadata authentication code obtained from message elements to form message metadata; and
   d) message body, after decrypting encrypted message body obtained from message elements using symmetric encryption decrypter with said symmetric encryption parameters and message body authentication code obtained from message elements to form message body.

22. The system of claim 21, wherein said system displays a message attachment after:
   a) an encrypted message attachment is selected from said list of encrypted message attachments to obtain encrypted message attachment and message attachment authentication code from message elements; and
   b) decrypting said encrypted message attachment using symmetric encryption decrypter with said symmetric encryption parameters and said message attachment authentication code to form message attachment.

* * * * *